United States Patent [19]

Eyer

[11] Patent Number: 4,493,484
[45] Date of Patent: Jan. 15, 1985

[54] DEVICE FOR GUIDING AND RECEIVING LETTERS AT THE EXIT OF A MAIL-SORTING MACHINE AND A MACHINE EQUIPPED WITH SAID DEVICE

[75] Inventor: Jean Eyer, Paris, France

[73] Assignee: Hotchkiss-Brandt-Sogeme-H.B.S., Paris, France

[21] Appl. No.: 428,333

[22] Filed: Sep. 29, 1982

[30] Foreign Application Priority Data

Oct. 9, 1981 [FR] France .................. 81 19080

[51] Int. Cl.³ .................. B65H 31/26; B65H 29/68
[52] U.S. Cl. .................. 271/220; 271/297; 271/303; 414/35; 414/51
[58] Field of Search ............ 209/900, 584, 933, 941, 209/534; 271/280, 281, 287–289, 297, 303, 305, 307, 189, 220, 224, 182; 414/35, 51, 53

[56] References Cited

U.S. PATENT DOCUMENTS

| | | | |
|---|---|---|---|
| 1,887,023 | 11/1932 | Hunziker | 271/220 |
| 3,052,467 | 9/1962 | Fertig | 271/188 |
| 3,371,926 | 3/1968 | Anderson | 271/305 |
| 3,580,563 | 5/1971 | Bassett | 271/288 |
| 3,889,811 | 6/1975 | Yoshimura | 209/584 |

FOREIGN PATENT DOCUMENTS

| | | |
|---|---|---|
| 1181132 | 11/1964 | Fed. Rep. of Germany ...... 271/224 |
| 2939343 | 8/1980 | Fed. Rep. of Germany . |
| 807591 | 11/1963 | France . |
| 1593144 | 7/1970 | France . |

OTHER PUBLICATIONS

*IBM Technical Disclosure Bulletin,* vol. 7, No. 8, Janvier 1965, H. P. Braen et al.: "Document Stacker", p. 714.
*IBM Technical Disclosure Bulletin* "Stacker Arm Pre--Load Adjustment Mechanism" R. J. Krolak, vol. 9, No. 11, Apr. 1967, p. 1633.
*IBM Technical Disclosure Bulletin* "Document Exit Tray" J. E. Jones and J. C. Rogers, vol. 15, No. 7, p. 2194, Dec. 1972.

*Primary Examiner*—David A. Scherbel
*Assistant Examiner*—Donald T. Hajec
*Attorney, Agent, or Firm*—Oblon, Fisher, Spivak, McClelland & Maier

[57] ABSTRACT

Letters discharged from a mail-sorting machine are received by a switching flap and pendulum for braking and guiding them towards the bottom of a selected basket-type compartment in order to form a stack. The mail baskets are disposed in interfitting relation and in a number of superposed rows at different levels.

10 Claims, 1 Drawing Figure

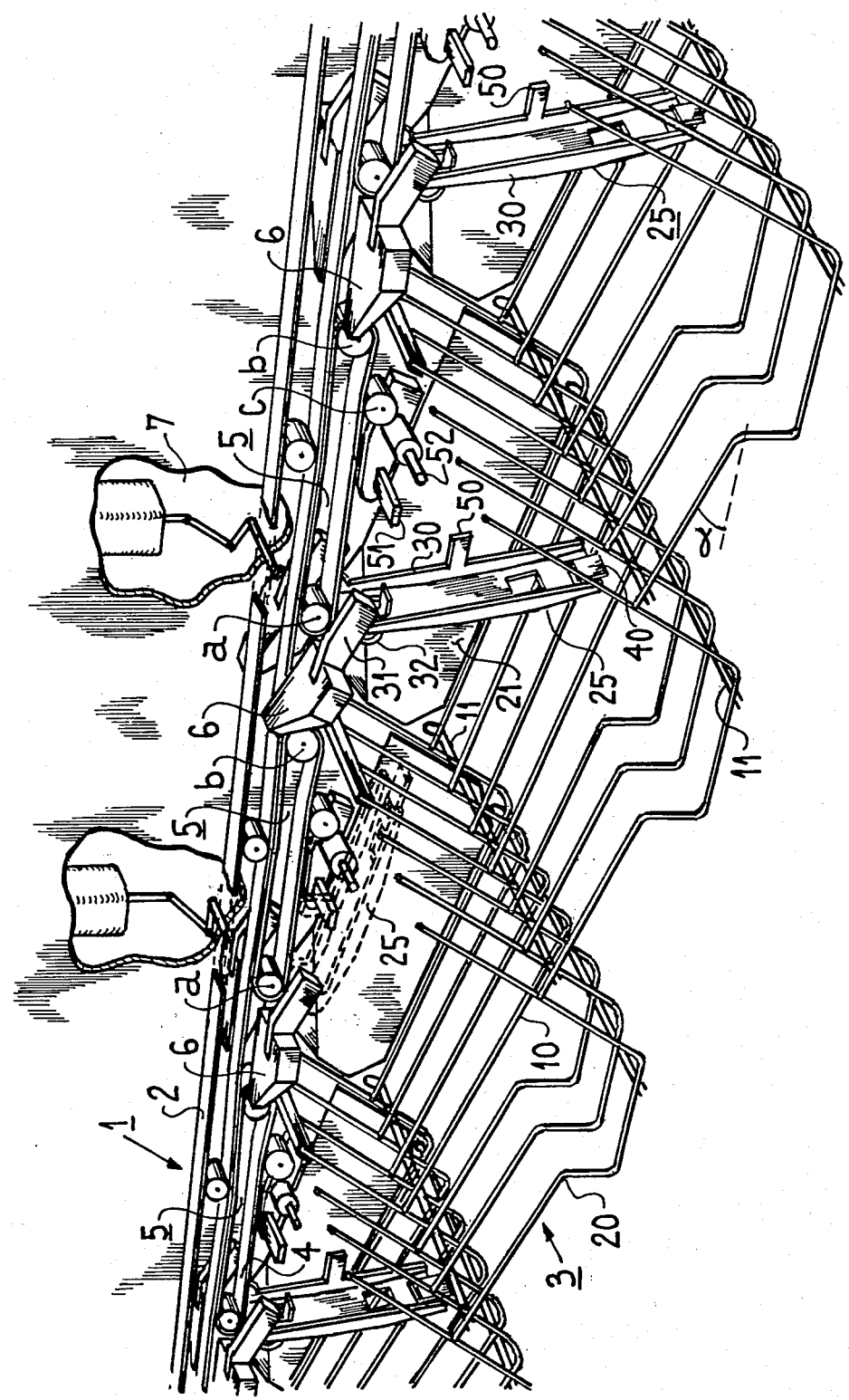

DEVICE FOR GUIDING AND RECEIVING LETTERS AT THE EXIT OF A MAIL-SORTING MACHINE AND A MACHINE EQUIPPED WITH SAID DEVICE

BACKGROUND OF THE INVENTION

This invention relates to a device for guiding and receiving letters at the exit of a mail-sorting machine.

As they are discharged from mail-sorting devices, letters are directed by different systems towards their receiving compartments. As a general rule, these compartments are each constituted by a moving horizontal platform on which the letters fall in order to form a stack. As the stack forms, so the platform moves down towards the bottom of the compartment. A restoring spring tends to maintain a constant pressure on the stack of letters which is sandwiched between the moving platform and a jogging roller.

Devices of this type are not suited to processing of letters of various sizes. Adjustment of the restoring spring is already a difficult operation within the scope of a small weight range but becomes impossible if the differences in weight are considerable. The letters located at the top of the stack are continuously in rubbing contact with the jogging roller. This results in relatively rapid wear of said roller as well as a risk of marking the letters. The complexity of these systems consequently introduces difficulties from the point of view of maintenance as well as high capital cost. Furthermore, the fact that the compartment has solid walls does not permit good visibility of letters and produces high noise levels.

SUMMARY OF THE INVENTION

The object of the present invention is to overcome these disadvantages and relates to a device for guiding and receiving letters at the exit of mail-sorting machines, comprising a system for conveying letters in cooperating relation with at least one receiving compartment. Each compartment is essentially designed in the form of a basket, letters being received as soon as they pass out of the conveying system by a pendulum which brakes and guides said letters towards the bottom of the selected basket in order to form a stack, the point of articulation of each pendulum being coupled with a flap having the function of deviating the letters discharged from said conveying system.

The main advantages of the device under consideration are essentially as follows:

a greater diversity of weight and size of letters; the device is in fact insensitive to the weight of letters for the formation of the stack, there is no spring-loaded balancing system, the bottom of the compartment is stationary, and the weight of the pendulum remains constant;
 total visibility of the receiving compartment;
 simple and easy maintenance;
 no danger of disturbance by any phenomenon arising from static electricity produced by frictional contact of letters with plastic material (jogging rollers);
 an acceptable noise level during operation.

The present invention is more specifically concerned with a device for guiding and receiving letters at the exit of mail-sorting machines, comprising a system for conveying letters in cooperating relation with at least one receiving compartment. Each compartment is designed in the form of a basket, letters being received as soon as they pass out of the conveying system by a pendulum which brakes and guides said letters towards the bottom of the selected basket in order to form a stack, the point of articulation of each pendulum being coupled with a flap having the function of deviating the letters discharged from said conveying system.

BRIEF DESCRIPTION OF THE DRAWINGS

These and other features of the invention will be more apparent upon consideration of the following description and of the single accompanying FIGURE which is a schematic diagram of a device according to the invention.

DETAILED DESCRIPTION OF THE PREFERRED EMBODIMENTS

The letters are transferred by means of a belt-conveyor system 1. A first top conveyor-belt 2 or so-called endless belt is displaced by driving means (not shown in the drawings). Three receiving compartments hereinafter designated as "baskets" 3 are shown diagrammatically in the FIGURE. In actual practice, provision can be made for any desired number of baskets which can vary from 1 to n according to the application considered. The top conveyor-belt 2 is adapted to cooperate with a bottom endless belt 4 which is frictionally driven by said top belt. The letters which are thus pinched between the two belts are conveyed towards their final destination, namely one of the baskets 3. The number of sections 5 of bottom conveyor-belts which pass around pulleys a and b corresponds to the number of baskets 3. A tensioning roller C is associated with each conveyor-belt section. Between each section 5, a flap 6 ensures continuity of travel of letters between an upstream section and a downstream section when it is in the rest position. Said flap is capable of taking up two positions, namely a rest position and a deviating position. Thus, if the flap is placed in the deviating position under the action of control means such as an electromagnet 7, for example, it intercepts the letter which appears at its level and deviates this letter towards the basket 3 with which said flap is associated. This movement of a flap from one position to another is controlled by a programming device.

In the case in which the electromagnet concerned has received the order to place the flap in the deviating position (this is the case, for example, of the flap associated with the basket which occupies the center of the FIGURE), all the letters appearing at its level are directed towards the corresponding basket in which the stack is formed. In a preferred alternative embodiment of the invention, the walls of the basket permit visibility of its contents and are formed, for example, of material which is either transparent or has an open-work structure. As shown in the FIGURE, the basket can be formed by stainless steel wires 10 assembled together by welding. Said wires are so arranged as to ensure that there is nothing to prevent the introduction of letters under any circumstances. The cross-members 11 for interconnecting the longitudinal wires are located beneath the plane of rest of the letters. The bottom of each basket is provided with a stepped portion 20 which forms a free space beneath the stack of letters, thus making it easy to grip the stack by hand, for example. The basket can also be formed of perforated steel sheet or of expanded metal. The front face is open (on the side nearest the operator). The rear face (on the side nearest the machine) is fitted with a shaped sheet-metal plate 21 having a smooth surface, the function of which is to prevent any letters from catching as they fall into the basket.

Said basket 3 is inclined in two planes. In the first place, it is inclined at an angle α with respect to the plane of arrival of the mail within the conveying system. This configuration makes it possible to benefit by the inertia of the letters in order to ensure more effective frontal jogging.

Furthermore, the baskets are fixed at right angles on the frame (not shown in the FIGURE) on the side nearest the machine, said frame being adapted to carry ancillary equipment such as electromagnets, pulleys and the like. The frame itself is rearwardly inclined (with respect to the operator) in order to ensure good stability of the letters and to forestall any danger of falling of the letters through the open front face. This second inclination is at an angle in the vicinity of 23° and also ensures excellent accessibility at the level of the baskets under good ergonomic conditions.

In the case of an assembly consisting of a plurality of baskets, the above-mentioned arrangement in which the baskets are inclined in the longitudinal direction permits a tiled array which offers a number of advantages including an appreciable saving of space. In particular, the front face of a first basket located upstream is employed not only for jogging the letters against said face but also serves as an entrance face for the basket which is located downstream and is contiguous to the first. Furthermore, the stepped recesses resulting from the tiled array serve to accommodate pulleys or tensioning rollers, conveyor-belts, and so on. In the event of superposition of several rows of baskets, all the baskets are identical over the entire length of the machine and at all levels.

Said baskets are easy to construct and sufficiently rigid to permit an overhung assembly for the purpose of providing enhanced accessibility.

In accordance with the invention, a pendulum 25 is associated with each basket for regulating the flow of letters. Said pendulum is constituted by an arm 30 of light alloy, for example, and pivotally mounted at the rear end of the switching flap 6 to which it corresponds by virtue of articulation means 31. The point of articulation must be located in a position which prevents any obstruction to the good flow of letters. The profile of said pendulum has a configuration which enables this latter to perform the function of deflectors, thereby contributing to the achievement of continuity of guiding of letters. A guiding means 32 which is represented in the FIGURE in the form of a spring but which can also be designed in the form of a rigid ski ensures continuity of the letter-guiding face and prevents the letters from catching at the level of the articulation of the pendulum. The length of the pendulum arm 30 must permit correct angular movement of this latter within the basket. The free end of said pendulum arm is fitted with a small tongue 40 of flexible material, the function of which is to reduce the rate of arrival of letters, thus preventing any danger of rebounding or pivotal displacement. Said small tongue also serves to maintain the stack of letters being formed. The weight of said arm 30 is an important parameter. It must be accurate and constant for all the pendulums 25 since it must produce a braking action but must not cause any stoppage of the flow of letters.

By way of example in the case of an application to letters in accordance with current standards, the length of the compartment is 255 mm, the axis of articulation of the pendulum is located at a distance of 165 mm from the jogging side, the optimum weight of the pendulum is 100 gr. Said pendulum can be allowed freedom in all its movements (configuration shown in the FIGURE). In order to accept letters of larger size and weight, it is necessary to have a longer and heavier pendulum. In this case, its movements must be controlled by a device which permits freedom of action of gravity in one direction so that the pendulum can always be in contact with the stack of letters, but which limits the reverse movement in order to prevent an unsteady state at the moment of impact as a result of arrival of a heavy letter.

This device, which is coupled directly to the pivot-pin of the pendulum, is composed of an element of the free-wheel or one-way clutch type coupled to a friction system or inertia system, the object thus contemplated being to permit free downward motion or slow upward return of the pendulum but also to brake and limit any excessively rapid upward return movement. The spring 32 has this function.

Said arm 30 is also fitted with a small right-angled lug 50 which is intended to cooperate with a proximity detector 51, the function of said detector being to indicate that filling of the basket 3 concerned has reached completion. A locking system 52 serves to neutralize the action of the pendulum 25 by maintaining it stationary in the top position if necessary. In this case, the corresponding basket is withdrawn from service.

The advantage of locking of the pendulum in the top position lies in the fact that, in the event of failure of an element of the compartment considered (for example an electromagnet which controls the switching flap), all other parts of the machine can still remain in use.

The operation is then said to be in a "degraded mode". In other words, letters intended for this compartment are simply sent to a dead-letter compartment exactly as in the case of normal operation after detection of a full compartment.

This configuration is shown on the left-hand side of the FIGURE in the case of the basket 3, the pendulum 25 of said basket being effectively immobilized in the top position.

A device in accordance with the invention is applicable to any machine for sorting mail which can appear in particular in different letter sizes.

Machines of this type can comprise a plurality of baskets 3 equipped with their pendulums 25 and interengaged so as to form a row. Provision can also be made for a plurality of rows placed at different levels. The number of rows is limited in height by the extent to which they can be reached by the operator: at the present time, five levels are possible.

In consequence, the device thus provided is of very flexible modular design and can be adapted to all mail-sorting applications.

What is claimed as new and desired to be secured by Letters Patent of the United States is:

1. A device for guiding and receiving letters at an exit of a mail-sorting machine, comprising:
   a system for conveying letters in cooperating relation with at least one receiving compartment, wherein each compartment is designed in the form of a basket;
   a pendulum articulated about an axis, said pendulum being positioned relative to said conveying system and basket such that said pendulum brakes and guides said letters towards the bottom of the selected basket in order to form a stack as soon as said letters pass out of said conveying system, said axis of articulation of each said pendulum being coupled with a flap having the function of deviating the letters discharged from said conveying system, wherein each said pendulum is constituted by a rigid arm terminating in a small tongue of flexible material and having a right-angled lug which cooperates with a proximity detector when the corresponding basket is full, wherein said device includes a locking system assigned to each basket and capable of stationarily maintaining the corresponding pendulum in a rest position.

2. A guiding device according to claim 1, wherein the walls constituting the basket are constructed to permit visibility of the contents of said basket.

3. A guiding device according to claim 1 or claim 2, wherein each said basket is inclined at an angle with respect to the plane of travel of letters within the conveying system, wherein the inertia of the letters is used in order to ensure correct frontal jogging of said letters in said basket.

4. A guiding device according to claim 1 in which each said basket is fixed at right angles on a frame carrying the conveying system, wherein said frame is inclined such that a rear face of said basket is positioned lower than a face opposite said rear face in order to ensure good stability of the letters and to prevent said letters from falling-out through said face opposite said rear face.

5. A guiding device according to claim 1, wherein the rear face of each basket is fitted with a shaped sheet-metal plate having a smooth surface, the function of said plate being to guide the letters and prevent any catching during transfer of said letters into the basket.

6. A guiding device according to claim 1, wherein the bottom of each basket on which a stack of letters is formed has a stepped portion which forms a free space beneath the stack in order to permit easy handling of said stack.

7. A guiding device according to claim 1, wherein the profile of the arm forms a deflector for guiding the letters as they are being transferred into the basket associated with said arm.

8. A mail-sorting machine, wherein said machine comprises at least one device according to claim 1 for guiding and receiving letters.

9. A mail-sorting machine according to claim 8, wherein said machine comprises a plurality of said baskets each equipped with one said pendulum, said baskets being placed in interfitting relation in a row, a front face of any given basket located upstream being an entry face of a basket which is located downstream and in contiguous relation to said given basket.

10. A mail-sorting machine according to claim 8, wherein said means for conveying include a bottom endless belt designated as an upstream belt and a bottom endless belt designated as a downstream belt, each bottom-belt section thus formed between two successive flaps being frictionally driven by a continuous top belt which is in turn set in motion by driving means, wherein each said deviating flap when in said rest position defines a surface located in a line of extension of said upstream and downstream belts, the letters being pinched between the top and bottom belts and transferred from one section to the next until they encounter a flap placed in the deviating position so as to direct said letters toward the corresponding basket, each letter thus deviated being then taken and transferred by the pendulum associated with said basket.

* * * * *